United States Patent Office 3,437,681
Patented Apr. 8, 1969

3,437,681
NOVEL PREPARATION OF ALKYL BIS(2,4-DINITROPHENYL)ACETATES
Robert A. McIvor, 1 Addison Gardens, London W. 14, England, and Raynor K. Miller, 2066 Westbury Road, Ottawa 5, Ontario, Canada
No Drawing. Filed Jan. 7, 1964, Ser. No. 336,105
Int. Cl. C07c 69/76
U.S. Cl. 260—471                  12 Claims

ABSTRACT OF THE DISCLOSURE

The process of preparing alkyl bis(2,4-dinitrophenyl) acetates which comprises condensing in a temperature between 25°–153° C. 1-chloro-2,4-dinitrobenzene with an alkyl 2,4-dinitrophenylacetate in a solvent comprising dimethylformamide in the presence of a base forming a hydrochloride salt.

---

These esters are soluble in organic solvents and are useful as acid-base indicators.

This invention relates to the preparation of alkyl bis (2,4-dinitrophenyl)acetates. Such esters are soluble in organic solvents and are useful as acid-base indicators.

Ethyl bis(2,4-dinitrophenyl)acetate was first prepared by Von Richter (Ber., 21, 2476 (1888)) by the reaction of 2,4-dinitrobromobenzene with ethyl 2,4-dinitrophenylacetate in the presence of sodium ethoxide. This reaction yielded the product in poor yield in a difficultly purifiable form.

The product has also been prepared from diethyl malonate in low yield and, again, purification is difficult (Von Richter, Ber., 21, 2471 (1888)).

It may also be obtained by nitration of ethyl diphenylacetate (Werner, Ber., 39, 1290 (1906)).

A primary feature of this invention is the provision of a process for the preparation of lower alkyl bis(2,4-dinitrophenyl)acetates in good yields.

A further feature of the present invention is the provision of a process for the preparation of lower alkyl bis(2,4-dinitrophenyl)acetates wherein the product may be easily purified.

By the present invention there is now provided a process for the preparation of lower alkyl bis(2,4-dinitrophenyl) acetates which comprises condensing 1-chloro-2,4-dinitrobenzene with a lower alkyl 2,4-dinitrophenylacetate in a solvent comprising dimethylformamide and in the presence of a base.

The solvent for the above reaction according to the present invention is dimethylformamide. The dimethylformamide must be present, for in its absence it has been found that there was a low yield of product. A mixture of dimethylformamide with polar solvents such as ethanol or other alcohols may be used, provided the concentration of dimethylformamide is at least 20 percent by volume.

The base which is used in the process of the present invention is a tertiary organic base, secondary organic base or an inorganic base. Examples of tertiary organic bases include triethylamine, tri-n-propylamine, triisopropylamine, or secondary amine as morpholine. Examples of inorganic alkali metal bases include sodium hydroxide and potassium hydroxide.

The temperature of the reaction may range from room temperature up to the boiling point of dimethylformamide (153° C.). However, best yields are obtained if the reaction is performed at room temperature.

A typical reaction according to the present invention is illustrated by the following equation:

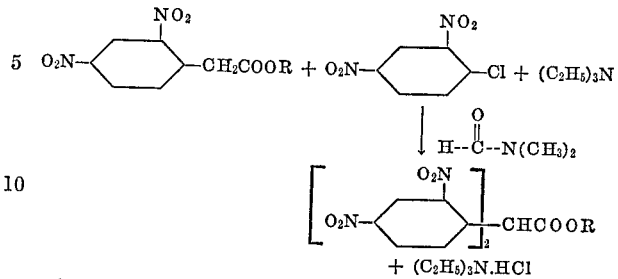

where R is an alkyl group of 1–4 carbon atoms.

The above reaction involves the condensation of 2,4-dinitrochlorobenzene with a lower alkyl 2,4-dinitrophenylacetate in the presence of triethylamine whereby hydrochloric acid is liberated and reacts with the triethylamine to form triethylamine hydrochloride.

The preferred proportions of reactants are 1 mole of 2,4-dinitrochlorobenzene to 1 mole of a lower alkyl 2,4-dinitrophenylacetate to 1.5 mole base. However, the reaction proceeds as indicated irrespective of the precise amounts of reactants supplied to the initial mixture and the present invention is not to be limited to the use of any proportions.

The following examples are given to illustrate this invention.

EXAMPLE 1

1-chloro-2,4-dinitrobenzene (8.7 gm., 0.043 mole) in dimethylformamide (15 ml.) is mixed with ethyl 2,4-dinitrophenylacetate (11.0 gm., 0.043 mole) in dimethylformamide (5 ml.). Tri-n-propylamine (12.3 gm., 0.086 mole) is added slowly to the stirred mixture maintaining a temperature of 25–30° C. After standing 4 days at room temperature the dark blue solution is acidified with concentrated hydrochloric acid. Water (15 ml.) and 95 percent ethanol (10 ml.) is then added. The green yellow solid is filtered and washed first with water (30 ml.) and then with 95 percent ethanol (30 ml.). Recrystallization from benzene gives a 69 percent yield of ethyl bis(2,4-dinitrophenyl)acetate.

Methyl 2,4-dinitrophenylacetate may be substituted for ethyl, 2,4-dinitrophenylacetate to give a 32 percent yield of methyl bis(2,4-dinitrophenyl)acetate.

EXAMPLE 2

Sodium hydroxide (4.0 gm., 0.1 mole) in water (7 ml.) is added slowly to a stirred mixture of 1-chloro-2,4-dinitrobenzene (10.2 gm., 0.05 mole) and ethyl 2,4-dinitrophenylacetate (12.7 gm., 0.05 mole) in dimethylformamide (20 ml.). The temperature is maintained at 27–35° C. during the addition. After standing 3 hours at room temperature the mixture is acidified with concentrated hydrochloric acid and water (15 ml.) followed by 95 percent ethanol (10 ml.) is added. The crude product is filtered and washed with water (30 ml.) and then 95 percent ethanol (30 ml.). Recrystallization from benzene gives a 52 percent yield of ethyl bis(2,4-dinitrophenyl)acetate.

EXAMPLE 3

Triethylamine (59.5 gm., 0.58 mole) is added slowly to a mixture of ethyl 2,4-dinitrophenylacetate (98.5 gm., 0.39 mole), 1-chloro-2,4-dinitrobenzene (79 gm., 0.39 mole) and dimethylformamide (156 ml.). The temperature is maintained at 26–40° C. by controlling the addition of the amine. After standing 48 hours at room temperature the mixture is acidified with concentrated hydrochloric acid, water (100 ml.) added followed by 95 percent ethanol (50 ml.) and the crude product filtered off.

The crude ethyl bis(2,4-dinitrophenyl)acetate is washed with water and ethanol and recrystallized from benzene in 71 percent yield.

EXAMPLE 4

Tri-n-propylamine (7.2 gm., 0.05 mole) is added slowly to a mixture of ethyl 2,4-dinitrophenylacetate (6.4 gm., 0.025 mole), 1-chloro-2,4-dinitrobenzene (7.6 gm., 0.037 mole) and 20 percent (v./v.) dimethylformamide in absolute ethanol (20 ml.). After standing 24 hours at room temperature the mixture is acidified with concentrated hydrochloric acid, water (10 ml.) plus 95 percent ethanol (5 ml.) is added and the crude product filtered off. Recrystallization from benzene gives ethyl bis(2,4-dinitrophenyl)acetate in 62 percent yield.

The embodiments of the invention in which an exclusive property or privilege is claimed are defined as follows:

1. The process of preparing alkyl bis(2,4-dinitrophenyl)acetates which comprises condensing in a temperature between 25°–153° C. 1-chloro-2,4-dinitrobenzene with an alkyl 2,4-dinitroacetate in a solvent essentially consisting of dimethylformamide in a base which is a tri-lower alkyl tertiary amine, morpholine or alkali metal hydroxide forming a hydrochloride salt.

2. In the process according to claim 1, wherein the solvent essentially consists of a mixture of 20% by volume of dimethylformamide and a lower alkyl alcohol.

3. In the process according to claim 1, wherein condensation being complete, the reaction mixture is acidified with hydrochloric acid, subsequent addition of a lower alkyl alcohol and recovery of the alkyl bis(2,4-dinitrophenyl)acetate.

4. The process of preparing alkyl bis(2,4-dinitrophenyl)acetates which comprises condensing in a temperature between 25°–40° C. 1-chloro-2,4-dinitrobenzene with an alkyl 2,4-dinitroacetate in a solvent essentially consisting of dimethylformamide in a base which is a tri-lower alkyl tertiary amine, morpholine or alkali metal hydroxide forming a hydrochloride salt.

5. In the process according to claim 4, wherein the tri-lower alkyl tertiary amine is triethylamine.

6. In the process according to claim 4, wherein the tri-lower alkyl tertiary amine is triisopropylamine.

7. In the process according to claim 4, wherein the tri-lower alkyl tertiary amine is tri-n-propylamine.

8. In the process according to claim 4, wherein the base is morpholine.

9. In the process according to claim 4, wherein the alkali metal base is sodium hydroxide.

10. In the process according to claim 9, wherein the said base is potassium hydroxide.

11. In the process according to claim 4, wherein the condensation being complete the reaction mixture is acidified with hydrochloric acid, subsequent addition of a lower alkyl alcohol and recovery of the alkyl bis(2,4-dinitrophenyl)acetates.

12. In the process according to claim 4, wherein the solvent essentially consists of a mixture of 20% by volume of dimethylformamide and a lower alkyl alcohol.

References Cited

Kornblum et al.: J.A.C.S., October-December 1952, vol. 74 p. 5782 relied on.

Von Richter: Berichte, vol. 21 (1888), pages 2475 to 2478 relied on.

LORRAINE A. WEINBERGER, *Primary Examiner.*

L. ARNOLD THAXTON, *Assistant Examiner.*

U.S. Cl. X.R.

252—408